(12) United States Patent
Zhou

(10) Patent No.: US 12,075,418 B2
(45) Date of Patent: Aug. 27, 2024

(54) METHOD AND DEVICE FOR REPORTING UPLINK CONTROL INFORMATION, STORAGE MEDIUM, AND USER EQUIPMENT

(71) Applicant: BEIJING UNISOC COMMUNICATIONS TECHNOLOGY CO., LTD., Beijing (CN)

(72) Inventor: Huan Zhou, Shanghai (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 511 days.

(21) Appl. No.: 17/416,128

(22) PCT Filed: Dec. 19, 2019

(86) PCT No.: PCT/CN2019/126525
§ 371 (c)(1),
(2) Date: Jun. 18, 2021

(87) PCT Pub. No.: WO2020/125708
PCT Pub. Date: Jun. 25, 2020

(65) Prior Publication Data
US 2022/0046681 A1 Feb. 10, 2022

(30) Foreign Application Priority Data
Dec. 19, 2018 (CN) .......................... 201811554918.5

(51) Int. Cl.
*H04W 72/04* (2023.01)
*H04B 7/06* (2006.01)
*H04W 72/21* (2023.01)

(52) U.S. Cl.
CPC .......... *H04W 72/21* (2023.01); *H04B 7/0626* (2013.01)

(58) Field of Classification Search
CPC ............. H04B 7/0626; H04L 27/0006; H04L 5/0007; H04L 5/0053; H04L 5/0078; H04L 5/0094; H04W 72/21; H04W 72/23
See application file for complete search history.

(56) References Cited

U.S. PATENT DOCUMENTS 11,122,560 B2 * 9/2021 Wu ................... H04W 72/1263
2018/0279300 A1 9/2018 Yang et al.
(Continued)

FOREIGN PATENT DOCUMENTS

| CN | 102594530 A | 7/2012 |
|---|---|---|
| CN | 106102168 A | 11/2016 |

(Continued)

OTHER PUBLICATIONS

International Search Report for International Application No. PCT/CN2019/126252; Date of Mailing, Mar. 19, 2020.
(Continued)

*Primary Examiner* — Phuc H Tran
(74) *Attorney, Agent, or Firm* — CANTOR COLBURN LLP

(57) ABSTRACT

A method and device for reporting uplink control information, a storage medium, and a user equipment. The method comprises: determining a time-frequency resource indication information of an uplink channel occupation information, the time-frequency resource indication information being used for indicating a time-frequency resource of an uplink channel occupied by a user equipment; carrying an uplink indication information by a preset time-frequency resource on a PUSCH scheduled by a PDCCH and/or a licensed PUSCH, the uplink indication information com-
(Continued)

S11 — determining a time-frequency resource indication information of an uplink channel occupation information, where the time-frequency resource indication information is used for indicating a time-frequency resource of an uplink channel occupied by a UE S12 — carrying an uplink indication information with a preset time-frequency resource on a PUSCH scheduled by a PDCCH and/or a licensed PUSCH, where the uplink indication information comprises the time-frequency resource indication information of the uplink channel occupation information S13 — sending the PUSCH scheduled by the PDCCH and/or the licensed PUSCH to a base station, so that the base station sends an information to be sent according to the time-frequency resource of the uplink channel indicated by the time-frequency resource indication information prising the time-frequency resource indication information of the uplink channel occupation information; sending the PUSCH scheduled by the PDCCH and/or the licensed PUSCH to a base station, so that the base station sends, according to the time-frequency resource of the uplink channel, information to be sent. The solution provided by the present invention facilitates reducing the time length of an uplink channel access process and improving the uplink and downlink communication efficiency.

10 Claims, 3 Drawing Sheets

(56) References Cited

U.S. PATENT DOCUMENTS

| | | | |
|---|---|---|---|
| 2018/0343670 A1 | 11/2018 | Park et al. | |
| 2019/0222395 A1* | 7/2019 | Larsson | H04L 5/0053 |
| 2019/0230655 A1* | 7/2019 | Wang | H04L 1/1671 |
| 2019/0342037 A1 | 11/2019 | Karaki et al. | |
| 2020/0068546 A1 | 2/2020 | Wu et al. | |
| 2020/0068563 A1 | 2/2020 | Wu et al. | |
| 2021/0058922 A1* | 2/2021 | Han | H04L 5/0055 |
| 2021/0385809 A1* | 12/2021 | Kang | H04W 72/0453 |
| 2023/0354466 A1* | 11/2023 | Li | H04W 76/27 |

FOREIGN PATENT DOCUMENTS

| | | |
|---|---|---|
| CN | 106231680 A | 12/2016 |
| CN | 108809545 A | 11/2018 |
| CN | 108810905 A | 11/2018 |
| WO | 2018073792 A1 | 4/2018 |

OTHER PUBLICATIONS

ZTE, "On UL inter UE Tx prioritization/multiplexing", 3GPP TSG RAN WG1 Meeting#95, R1-1812389, Spokane, USA, Nov. 12-16, 2018; 7 pages.

EPO Extended European Search Report for corresponding EP Application No. 19897794.4; Issued on Jul. 19, 2022.

Huawei, "HARQ for autonomous UL access on unlicensed SCell", 3GPP TSG RAN WG1 Meeting #90, R1-1712125, Aug. 21-25, 2017; 4 pages.

Huawei, "Transmission with configured grant NR unlicensed band", 3GPP TSG RAN WG1 Meeting #95, R1-1812197, Nov. 12-16, 2018; 9 pages.

Qualcomm Incorporated, "Enhancement to configured grants in NR unlicensed", 3GPP TSG RAN WG1 Meeting #95, R1-1813416, Nov. 12-16, 2018; 7 pages.

* cited by examiner a first non-DMRS symbol after a first DMRS symbol 
a first DMRS symbol 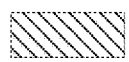
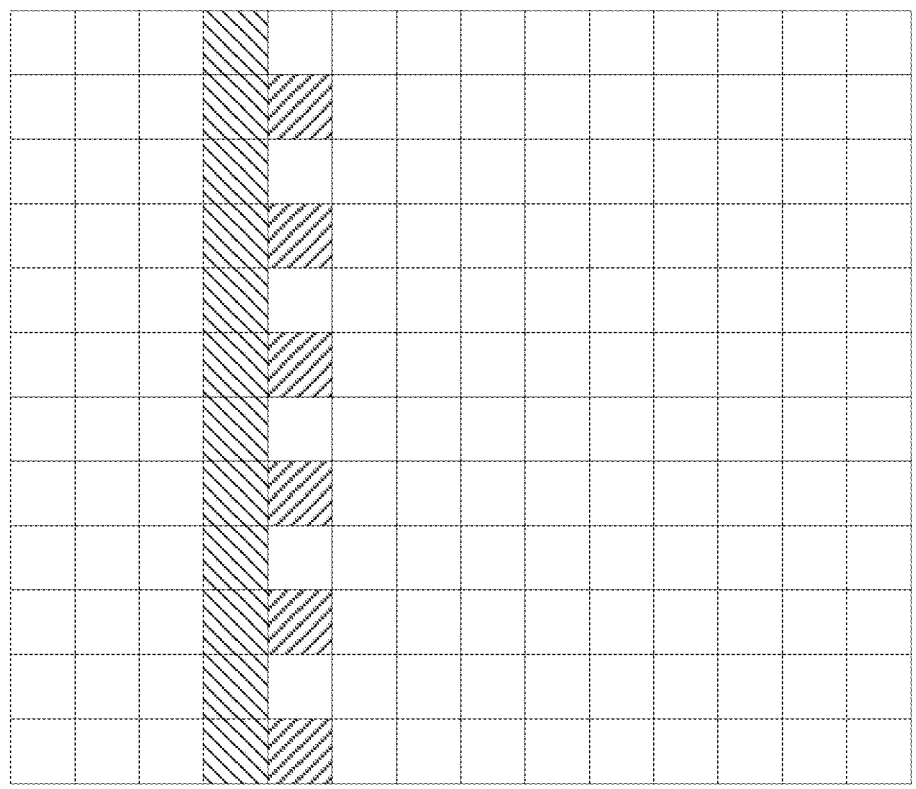
FIG. 3
FIG. 4

METHOD AND DEVICE FOR REPORTING UPLINK CONTROL INFORMATION, STORAGE MEDIUM, AND USER EQUIPMENT

CROSS REFERENCE TO RELATED APPLICATIONS

This is the U.S. national stage of application No. PCT/CN2019/126525, filed on Dec. 19, 2019. Priority under 35 U.S.C. § 119(a) and 35 U.S.C. § 365(b) is claimed from Chinese Application No. 201811554918.5, filed Dec. 19, 2018, the disclosure of which is also incorporated herein by reference.

TECHNICAL FIELD

The present disclosure generally relates to communication technology field, and more particularly, to a method and a device for reporting an uplink control information, a storage medium and a user equipment.

BACKGROUND

The 3rd Generation Partnership Project (3GPP) standards organization is studying how to deploy an NR network on an unlicensed spectrum, so as to achieve fair and effective utilization of the unlicensed spectrum and improve data transmission rate of a 5G New Radio (NR) system. The NR uses the unlicensed spectrum in three ways: firstly, a NR cell of the unlicensed spectrum works as a primary cell; secondly, a User Equipment (UE) accesses the NR cell of the unlicensed spectrum through a Long Term Evolution (LTE) cell; and thirdly, the UE accesses the NR cell of the unlicensed spectrum through the NR cell. In the second and the third ways, the licensed spectrum and the unlicensed spectrum may be used in combination in a way such as carrier aggregation, that is, a UE, for example, an Evolved Node B (gNB) may work both on the licensed spectrum and the unlicensed spectrum, which is also known as New RAT Unlicense (NR-U) technology.

Furthermore, if channel occupancy may be shared between a base station and a UE, system performance of the NR-U can be greatly improved, so the 3GPP discussed and decided to use a Physical Downlink Control Channel (PDCCH) to notify the UE of a channel occupancy time and frequency information.

However, in prior art, there is no setting for the UE to share an uplink channel occupancy information with the gNB, resulting in a long uplink channel access process and low uplink/downlink communication efficiency.

SUMMARY

Embodiments of the present disclosure provide a method and device for reporting an uplink control information, a storage medium and a user equipment, which may facilitate reducing a duration of an uplink channel access process and improving uplink/downlink communication efficiency.

In an embodiment of the present disclosure, a method for reporting an uplink control information is provided, including: determining a time-frequency resource indication information of an uplink channel occupation information, where the time-frequency resource indication information is used for indicating a time-frequency resource of an uplink channel occupied by a user equipment (UE); carrying an uplink indication information with a preset time-frequency resource on a Physical Uplink Shared Channel (PUSCH) scheduled by a Physical Downlink Control Channel (PDCCH) and/or a licensed PUSCH, where the uplink indication information includes the time-frequency resource indication information of the uplink channel occupation information; and sending the PUSCH scheduled by the PDCCH and/or the licensed PUSCH to a base station, so that the base station sends an information to be sent according to the time-frequency resource of the uplink channel indicated by the time-frequency resource indication information.

Optionally, the preset time-frequency resource includes a first non-Demodulation Reference Signal (non-DMRS) symbol and a first symbol which is a non-Hybrid Automatic Repeat request Acknowledgement (non-HARQ-ACK) resource of the PUSCH scheduled by the PDCCH and/or of the licensed PUSCH.

Optionally, when the PUSCH carries a Channel State Information 1 (CSI1), a time-frequency resource of the CSI1 is located after the preset time-frequency resource.

Optionally, the preset time-frequency resource includes a first non-DMRS symbol after a first DMRS symbol and a first symbol which is a non-HARQ-ACK resource of the PDCCH scheduled PUSCH and/or the licensed PUSCH.

Optionally, when the PUSCH carries a HARQ-ACK information, a time-frequency resource of the HARQ-ACK information is located before or after the preset time-frequency resource.

Optionally, the uplink indication information further includes at least one of: a HARQ process, a Redundancy Version (RV) and a CSI.

In an embodiment of the present disclosure, a device for reporting an uplink control information is provided, including: an indication information determining module, adapted to determine a time-frequency resource indication information of an uplink channel occupation information, where the time-frequency resource indication information is used for indicating a time-frequency resource of an uplink channel occupied by a UE; an indication information carry module, adapted to carry an uplink indication information with a preset time-frequency resource on a PUSCH scheduled by a PDCCH and/or a licensed PUSCH, where the uplink indication information includes the time-frequency resource indication information of the uplink channel occupation information; and a sending module, adapted to send the PUSCH scheduled by the PDCCH and/or the licensed PUSCH to a base station, so that the base station sends an information to be sent according to the time-frequency resource of the uplink channel indicated by the time-frequency resource indication information.

Optionally, the preset time-frequency resource includes a first non-Demodulation Reference Signal (non-DMRS) symbol and a first symbol which is a non-Hybrid Automatic Repeat request Acknowledgement (non-HARQ-ACK) resource of the PUSCH scheduled by the PDCCH and/or of the licensed PUSCH.

In an embodiment of the present disclosure, a storage medium having computer instructions stored therein is provided, wherein once the computer instructions are executed, the above active noise reduction method is performed.

In an embodiment of the present disclosure, a user equipment including a memory and a processor is provided, wherein the memory has computer instructions stored therein, and when the processor executes the computer instructions, the above method is performed.

Embodiments of the present disclosure may provide following advantages.

In embodiments of the present disclosure, a time-frequency resource indication information of an uplink channel occupation information is determined, where the time-frequency resource indication information is used for indicating a time-frequency resource of an uplink channel occupied by a user equipment (UE); an uplink indication information is carried with a preset time-frequency resource on a Physical Uplink Shared Channel (PUSCH) scheduled by a PDCCH and/or a licensed PUSCH, where the uplink indication information includes the time-frequency resource indication information of the uplink channel occupation information; and the PUSCH scheduled by the PDCCH and/or the licensed PUSCH is sent to a base station, so that the base station sends an information to be sent according to the time-frequency resource of the uplink channel indicated by the time-frequency resource indication information. According to the embodiments of the present disclosure, the UE carries the uplink indication information by using the preset time-frequency resource on the PUSCH scheduled by the PDCCH and/or the licensed PUSCH, where the uplink indication information includes the time-frequency resource indication information of the uplink channel occupancy information, so that the base station can send the information to be sent according to the time-frequency resource of the uplink channel indicated by the time-frequency resource indication information. In the existing techniques, the UE is not designed to share the uplink channel occupancy information with the gNB. However, by embodiments of the present disclosure, the UE can share the uplink channel occupancy information with the gNB, which requires less LBTs Or no LBT, thereby reducing the duration of the uplink channel access process and improving the uplink/downlink communication efficiency.

BRIEF DESCRIPTION OF THE DRAWINGS

FIG. 3 is a schematic diagram of a preset time-frequency resource according to another embodiment; and FIG. 4 schematically illustrates a structural diagram of a device for reporting an uplink control information according to an embodiment.

DETAILED DESCRIPTION

Figure 1:
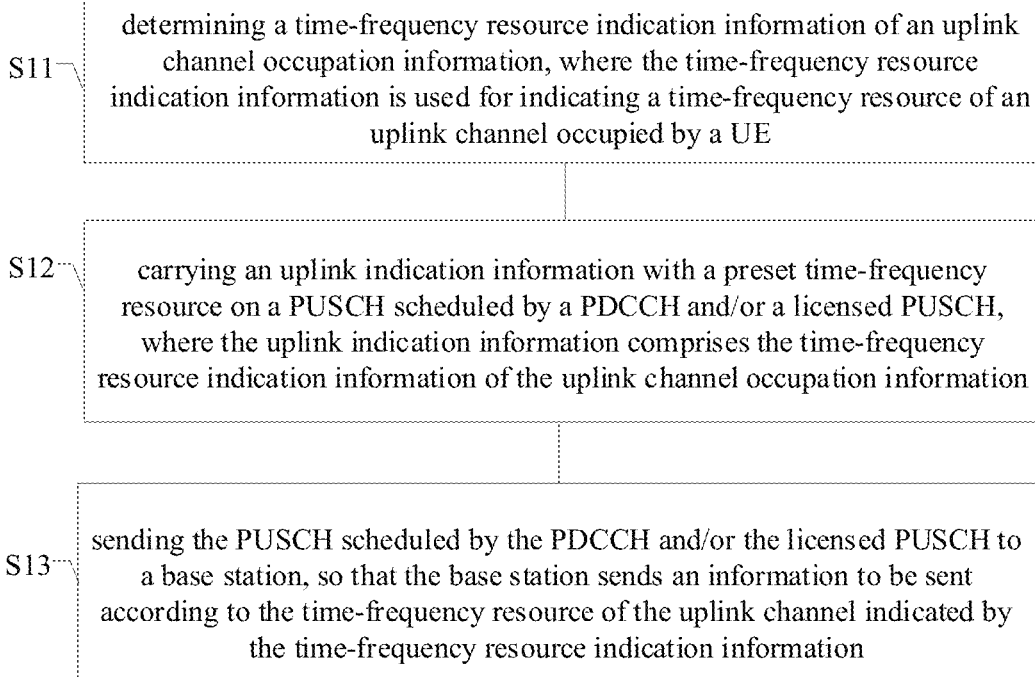
FIG. 1 schematically illustrates a flow chart of a method for reporting an uplink control information according to an embodiment.

As described in background, if channel occupancy may be shared between a base station and a UE, system performance of the NR-U can be greatly improved, so the 3GPP discussed and decided to use a Physical Downlink Control Channel (PDCCH) to notify the UE of a channel occupancy time and frequency information.

Specifically, in the prior art, a Listen-Before-Talk (LBT) process is performed to achieve the coexistence of different operators and other systems in an unlicensed spectrum. The LBT process means that in the unlicensed spectrum, nodes determine whether a current channel is available through a clear channel assessment (CCA) before transmitting data. Further, each LBT process includes energy detection to determine whether the channel is occupied. Some regional laws and regulations stipulate an energy detection threshold. If energy received by a node is higher than the energy detection threshold, the channel is considered to be busy. Two channel access processes are supported in a downlink transmission of Licensed-assisted Access Using LTE (LAA-LTE): Type l and Type 2. Specifically, Type 1 channel access is based on a LTE Category 4 (Cat 4) channel access, and Type 2 channel access is a channel access having a fixed time duration (in which LBT is performed for at least 25 us before transmission).

Inventors of the present disclosure found through research that, in the prior art, a UE is not designed to share an uplink channel occupancy information with a gNB and multiple LBT processes are required, resulting in a long uplink channel access process and low uplink/downlink communication efficiency.

In embodiments of the present disclosure, a time-frequency resource indication information of an uplink channel occupation information is determined, where the time-frequency resource indication information is used for indicating a time-frequency resource of an uplink channel occupied by a user equipment (UE); an uplink indication information is carried with a preset time-frequency resource on a Physical Uplink Shared Channel (PUSCH) scheduled by a PDCCH and/or a licensed PUSCH, where the uplink indication information includes the time-frequency resource indication information of the uplink channel occupation information; and the PUSCH scheduled by the PDCCH and/or the licensed PUSCH is sent to a base station, so that the base station sends an information to be sent according to the time-frequency resource of the uplink channel indicated by the time-frequency resource indication information. According to the embodiments of the present disclosure, the UE carries the uplink indication information by using the preset time-frequency resource on the PUSCH scheduled by the PDCCH and/or the licensed PUSCH, where the uplink indication information includes the time-frequency resource indication information of the uplink channel occupancy information, so that the base station can send the information to be sent according to the time-frequency resource of the uplink channel indicated by the time-frequency resource indication information. In the existing techniques, the UE is not designed to share the uplink channel occupancy information with the gNB. However, by embodiments of the present disclosure, the UE can share the uplink channel occupancy information with the gNB, which requires less LBTs Or no LBT, thereby reducing the duration of the uplink channel access process and improving the uplink/downlink communication efficiency.

In order to clarify the object, characteristic and advantages of embodiments of the present disclosure, embodiments of present disclosure will be described clearly in detail in conjunction with accompanying drawings.

In an embodiment of the present disclosure, a method for reporting an uplink control information is provided. Referring to FIG. 1, the method for reporting an uplink control information includes S11 to S13.

In S11, a time-frequency resource indication information of an uplink channel occupation information is determined, where the time-frequency resource indication information is used for indicating a time-frequency resource of an uplink channel occupied by a UE;

In S12, an uplink indication information is carried with a preset time-frequency resource on a Physical Uplink Shared Channel (PUSCH) scheduled by a PDCCH and/or a licensed PUSCH, where the uplink indication information includes the time-frequency resource indication information of the uplink channel occupation information;

In S13, the PUSCH scheduled by the PDCCH and/or the licensed PUSCH is sent to a base station, so that the base station sends an information to be sent according to the time-frequency resource of the uplink channel indicated by the time-frequency resource indication information.

In some embodiments, in S11, after the UE occupies the uplink channel, the time-frequency resource of the occupied uplink channel may be determined, and then the time-frequency resource indication information of the uplink channel occupancy information may be used to indicate the time-frequency resource of the occupied uplink channel.

Those skilled in the art can understand that the UE may indicate the time-frequency resource with a conventional manner, which is not limited in the embodiments of the present disclosure.

In some embodiments, in S12, the preset time-frequency resource on the PUSCH scheduled by PDCCH and/or the licensed PUSCH is used to carry the uplink indication information.

In some embodiments, the preset time-frequency resource is a first non-Demodulation Reference Signal (non-DMRS) symbol and a first non-Hybrid Automatic Repeat request Acknowledgement (non-HARQ-ACK) symbol of the PUSCH scheduled by the PDCCH and/or the licensed PUSCH.

Figure 2:
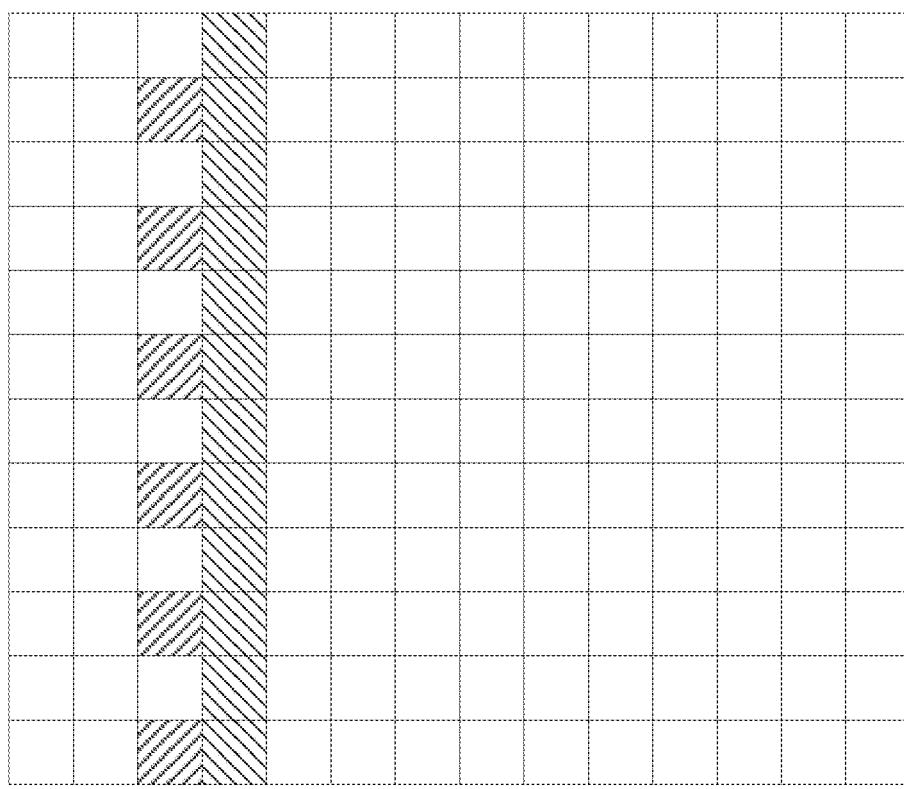
FIG. 2 is a schematic diagram of a preset time-frequency resource according to an embodiment.

FIG. 2 is a schematic diagram of a preset time-frequency resource according to an embodiment.

Referring to FIG. 2, Symbol 2 is a first available non-DMRS symbol, and Symbol 3 is a DMRS symbol.

Specifically, on the PUSCH scheduled by the PDCCH, the uplink indication information may be mapped from the first non-DMRS symbol of the PUSCH. It should be noted that, on the licensed PUSCH, the uplink indication information may also be mapped from the first non-DMRS symbol of the licensed PUSCH.

In an embodiment, the uplink indication information may also be mapped from a first symbol which is a non-HARQ-ACK resource of the PUSCH scheduled by the PDCCH and/or of the licensed PUSCH.

Specifically, the uplink indication information cannot be mapped to a Resource Element (RE) position reserved for HARQ-ACK or a HARQ-ACK RE mapping position, and cannot be frequency division multiplexed with a PUSCH DMRS.

In an embodiment, if the PUSCH frequency hops, the uplink indication information may be mapped from a first non-DMRS symbol of each hopping, and cannot be mapped to a RE position reserved for HARQ-ACK or a HARQ-ACK RE mapping position, and cannot be frequency division multiplexed with a PUSCH DMRS.

Further, when the PUSCH carries a Channel State Information 1 (CSI1), a time-frequency resource of the CSI1 is located after the preset time-frequency resource.

In an embodiment, the CSI1 is mapped from a first non-DMRS symbol of the PUSCH, and the CSI1 cannot be mapped to a RE position reserved for HARQ-ACK, or a HARQ-ACKRE mapping position, or a mapping position of the uplink indication information, and cannot be frequency division multiplexed with a PUSCH DMRS.

In an embodiment, if the PUSCH frequency hops, the CSI1 may be mapped from a first non-DMRS symbol of each hopping, and the CSI1 cannot be mapped to a RE position reserved for HARQ-ACK, or a HARQ-ACKRE mapping position, or a mapping position of the uplink indication information, and cannot be frequency division multiplexed with a PUSCH DMRS.

In the embodiments of the present disclosure, the time-frequency resource of the CSI1 is set to be located after the preset time-frequency resource when the PUSCH carries the CSI1, so that conflicts between the time-frequency resource of the CSI1 and the preset time-frequency resource can be avoided, thereby improving communication quality effectively.

In some embodiments, if the uplink indication information is mapped to an Orthogonal Frequency Division Multiplexing (OFDM) symbol i, distributed mapping is performed on a report information after scheduling and REs, and an interval d may be set in the following two ways:

(1) If a number of unmapped report information symbols after scheduling is greater than a number of REs available on an OFDM symbol, d=1; and if there is more unmapped report information, the more unmapped report information continues to be mapped to a next OFDM symbol.

(2) If the number of unmapped report information symbols after scheduling is less than the number of REs available on the OFDM symbol, then d=floor (which means the number of REs available on the OFDM symbol/the number of reported information symbols after scheduling).

FIG. 3 is a schematic diagram of a preset time-frequency resource according to another embodiment.

Referring to FIG. 3, Symbol 3 is a DMRS symbol, and Symbol 4 is a non-DMRS symbol after a first DMRS symbol.

In an embodiment, on a PUSCH scheduled by a PDCCH and/or a licensed PUSCH, the uplink indication information may be mapped from a first non-DMRS symbol after a first DMRS symbol.

In another embodiment, the uplink indication information may be mapped from a first symbol which is a non-HARQ-ACK resource of the PUSCH scheduled by the PDCCH and/or the licensed PUSCH.

Specifically, the uplink indication information cannot be mapped to a RE position reserved for HARQ-ACK or a HARQ-ACKRE mapping position, and cannot be frequency division multiplexed with a PUSCH DMRS.

In an embodiment, if the PUSCH frequency hops, the uplink indication information may be mapped from a first non-DMRS symbol of each hopping, and cannot be mapped to a RE position reserved for HARQ-ACK or a HARQ-ACK RE mapping position, and cannot be frequency division multiplexed with a PUSCH DMRS.

Further, when the PUSCH carries a HARQ-ACK information, a time-frequency resource of the HARQ-ACK information may be located before or after the preset time-frequency resource.

In an embodiment about the implementation of the HARQ-ACK information, the time-frequency resource of the HARQ-ACK information is located before the preset time-frequency resource.

Specifically, the uplink indication information may be mapped from a non-DMRS symbol after a first DMRS of the PUSCH. Further, the uplink indication information cannot be mapped to a RE position reserved for HARQ-ACK or a HARQ-ACKRE mapping position, and cannot be frequency division multiplexed with a PUSCH DMRS.

In an embodiment, if the PUSCH frequency hops, the uplink indication information may be mapped from a non-DMRS symbol after a first DMRS symbol of each hopping, and cannot be mapped to a RE position reserved for HARQ-ACK or a HARQ-ACK RE mapping position, and cannot be frequency division multiplexed with a PUSCH DMRS.

In another embodiment about the implementation of the HARQ-ACK information, the time-frequency resource of the HARQ-ACK information is located after the preset time-frequency resource.

Specifically, the uplink indication information may be mapped from a non-DMRS symbol after a first DMRS of the PUSCH and cannot be frequency division multiplexed with a PUSCH DMRS.

In an embodiment, if the PUSCH frequency hops, the uplink indication information may be mapped from a non-DMRS symbol after a first DMRS symbol of each hopping, and cannot be frequency division multiplexed with a PUSCH DMRS.

According to the embodiments described above, by setting that when the PUSCH carries the HARQ-ACK information, the time-frequency resource of the HARQ-ACK information is located before or after the preset time-frequency resource, conflicts between the time-frequency resource of the HARQ-ACK information and the preset time-frequency resource can be avoided, thereby improving the communication quality greatly.

Specifically, according to the embodiments described above, the HARQ-ACK information may be mapped from the non-DMRS symbol after the first DMRS of the PUSCH, and cannot be mapped to the RE position reserved for the uplink indication information or the mapping position of the uplink indication information, and is not frequency division multiplexed with the PUSCH DMRS. Further, if the PUSCH frequency hops, the uplink indication information may be mapped from the non-DMRS symbol after the first DMRS of the PUSCH of each hopping, and cannot be mapped to the RE position reserved for the uplink indication information or the mapping position of the uplink indication information, and is not frequency division multiplexed with the PUSCH DMRS.

Therefore, when the PUSCH carries the HARQ-ACK information, if the time-frequency position of the HARQ-ACK information is not limited, conflicts between the time-frequency resource of the HARQ-ACK information and the preset time-frequency resource are likely to occur, which will affect the communication quality.

In some embodiments, if the uplink indication information is mapped to an Orthogonal Frequency Division Multiplexing (OFDM) symbol i, distributed mapping is performed on a report information after scheduling and REs, and an interval d may be set in the following two ways:

(1) If a number of unmapped report information symbols after scheduling is greater than a number of REs available on an OFDM symbol, d=1; and if there is more unmapped report information, the more unmapped report information continues to be mapped to a next OFDM symbol.

(2) If the number of unmapped report information symbols after scheduling is less than the number of REs available on the OFDM symbol, then d=floor (which means the number of REs available on the OFDM symbol/the number of reported information symbols after scheduling).

Furthermore, when the PUSCH carries an HARQ-ACK or a Sounding reference signal (SRS) and when the PUSCH carries a CSI1, the uplink indication information may be set to be located before or after the HARQ-ACK.

Specifically, the PUSCH may carry the uplink indication information, the HARQ-ACK/SRS and the CSI1 in sequence; or the PUSCH may also carry the HARQ-ACK/SRS, the uplink indication information and the CSI1 in sequence.

It should be noted that mapping positions of the HARQ-ACK and the CSI1 after encoding may be the same as before encoding.

Further, the uplink indication information may further include at least one of the following: a Hybrid Automatic Repeat reQuest Process (HARQ process), a Redundancy Version (RV), and a CSI.

In some embodiments, in addition to the time-frequency resource indication information of the uplink channel occupancy information, the NR-U may also require the UE to report other scheduling information, such as the HARQ process, the RV, so the uplink indication information may further include the other scheduling information, which facilitates improving transmission efficiency.

FIG. 4 schematically illustrates a structural diagram of a device for reporting an uplink control information according to an embodiment. Referring to FIG. 4, the device for reporting an uplink control information may include:

an indication information determining module 41, adapted to determine a time-frequency resource indication information of an uplink channel occupation information, where the time-frequency resource indication information is used for indicating a time-frequency resource of an uplink channel occupied by a UE;

an indication information carry module 42, adapted to carry an uplink indication information with a preset time-frequency resource on a PUSCH scheduled by a PDCCH and/or a licensed PUSCH, where the uplink indication information includes the time-frequency resource indication information of the uplink channel occupation information; and a sending module 43, adapted to send the PUSCH scheduled by the PDCCH and/or the licensed PUSCH to a base station, so that the base station sends an information to be sent according to the time-frequency resource of the uplink channel indicated by the time-frequency resource indication information.

In some embodiments, the preset time-frequency resource include a first non-DMRS symbol and a first symbol which is a non-HARQ-ACK resource of the PUSCH scheduled by the PDCCH and/or of the licensed PUSCH.

In some embodiments, when the PUSCH carries a CSI1, a time-frequency resource of the CSI1 may be located after the preset time-frequency resource.

In some embodiments, the preset time-frequency resource may include a first non-DMRS symbol after a first DMRS symbol and a first symbol which is a non-HARQ-ACK resource of the PUSCH scheduled by the PDCCH and/or of the licensed PUSCH.

In some embodiments, when the PUSCH carries a HARQ-ACK information, a time-frequency resource of the HARQ-ACK information may be located before or after the preset time-frequency resource.

In some embodiments, the uplink indication information may further include one or more of the following: a HARQ process, a RV, and a CSI.

Principles, detailed implementation and advantages of the device for reporting an uplink control information can be found in the above descriptions of the method as shown in FIG. 1 to FIG. 3, and are not described here.

In an embodiment of the present disclosure, a storage medium having computer instructions stored therein is provided, wherein when the computer instructions are executed, the above method for reporting an uplink control information is performed. The storage medium may be a computer readable storage medium, for example, including a non-volatile or non-transitory memory, an optical disk, a mechanical disk, a solid disk or the like.

In an embodiment of the present disclosure, a user equipment including a memory and a processor is provided, wherein the memory has computer instructions stored therein, and when the processor executes the computer instructions, the above method for reporting an uplink control information is performed. The user equipment may include but not limited to a mobile phone, a computer or a tablet computer.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for reporting an uplink control information, performed by a user equipment (UE) and comprising:
    determining a time-frequency resource indication information of an uplink channel occupation information, where the time-frequency resource indication information is used for indicating a time-frequency resource of an uplink channel occupied by the UE;
    carrying an uplink indication information with a preset time-frequency resource on a Physical Uplink Shared Channel (PUSCH) scheduled by a Physical Downlink Control Channel (PDCCH) and/or a configured grant PUSCH, where the uplink indication information comprises the time-frequency resource indication information of the uplink channel occupation information; and
    sending the PUSCH scheduled by the PDCCH and/or the configured grant PUSCH to a base station, to make the base station send an information according to the time-frequency resource of the uplink channel indicated by the time-frequency resource indication information.

2. The method for reporting an uplink control information according to claim 1, wherein the preset time-frequency resource comprises a first non-Demodulation Reference Signal (non-DMRS) symbol and a first symbol which is a non-Hybrid Automatic Repeat request Acknowledgement (non-HARQ-ACK) resource of the PUSCH scheduled by the PDCCH and/or of the configured grant PUSCH.

3. The method for reporting an uplink control information according to claim 2, wherein when the PUSCH carries a Channel State Information 1 (CSI1), a time-frequency resource of the CSI1 is located after the preset time-frequency resource.

4. The method for reporting an uplink control information according to claim 1, wherein the preset time-frequency resource comprises a first non-DMRS symbol after a first DMRS symbol and a first symbol which is a non-HARQ-ACK resource of the PDCCH scheduled PUSCH and/or the configured grant PUSCH.

5. The method for reporting an uplink control information according to claim 4, wherein when the PUSCH carries a HARQ-ACK information, a time-frequency resource of the HARQ-ACK information is located before or after the preset time-frequency resource.

6. The method for reporting an uplink control information according to claim 1, wherein the uplink indication information further comprises at least one of: a HARQ process, a Redundancy Version (RV) and a CSI.

7. A device for reporting an uplink control information, applied to a user equipment (UE) and comprising:
    an indication information determining circuitry, adapted to determine a time-frequency resource indication information of an uplink channel occupation information, where the time-frequency resource indication information is used for indicating a time-frequency resource of an uplink channel occupied by the UE;
    an indication information carrying circuitry, adapted to carry an uplink indication information with a preset time-frequency resource on a PUSCH scheduled by a PDCCH and/or a configured grant PUSCH, where the uplink indication information comprises the time-frequency resource indication information of the uplink channel occupation information; and
    a sending circuitry, adapted to send the PUSCH scheduled by the PDCCH and/or the configured grant PUSCH to a base station, to make the base station send an information according to the time-frequency resource of the uplink channel indicated by the time-frequency resource indication information.

8. The device for reporting an uplink control information according to claim 7, wherein the preset time-frequency resource comprises a first non-Demodulation Reference Signal (non-DMRS) symbol and a first symbol which is a non-Hybrid Automatic Repeat request Acknowledgement (non-HARQ-ACK) resource of the PUSCH scheduled by the PDCCH and/or of the configured grant PUSCH.

9. A non-transitory computer storage medium having computer instructions stored therein, wherein once the computer instructions are executed, the method for reporting an uplink control information according to claim 1 is performed.

10. A user equipment comprising a memory and a processor is provided, wherein the memory has computer instructions stored therein, and when the processor executes the computer instructions, the method for reporting the uplink control information according to claim 1 is performed.

* * * * *